Sept. 11, 1928.
J. KAUFMANN
1,683,620
SLOTTING AND SLITTED LIGHT TRANSMITTER
Filed Sept. 8, 1925    2 Sheets-Sheet 1
Fig.1. BORE
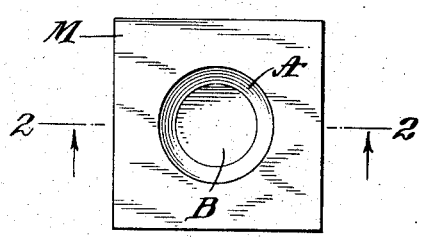
Fig.2. DEPRESSION
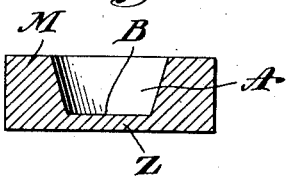
Fig.3. VEE BOTTOM
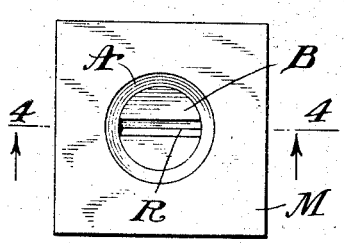
Fig.4. DEPRESSION
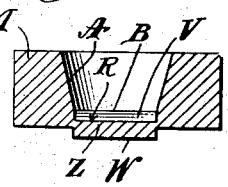
Fig.5. VEE WALE
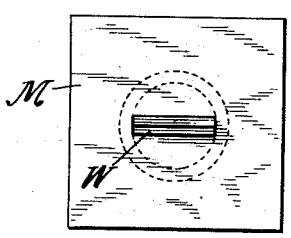
Fig.6. WALE GROUND
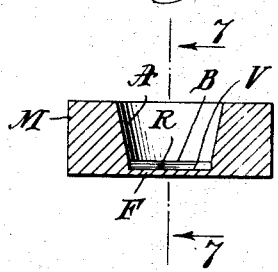
Fig.7. FILM FORMED
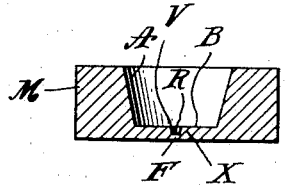
Fig.8. SLOT FILM
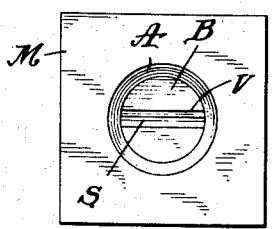
Fig.9. POLISH SLIT
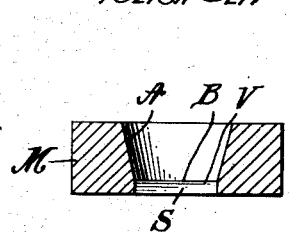
Fig.10. POLISH SLIT
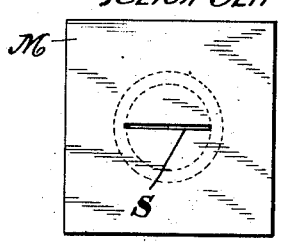
Inventor:
JOHN KAUFMANN
By his Attorney
Philip Farnsworth Sept. 11, 1928.  J. KAUFMANN  1,683,620
SLOTTING AND SLITTED LIGHT TRANSMITTER
Filed Sept. 8, 1925  2 Sheets-Sheet 2
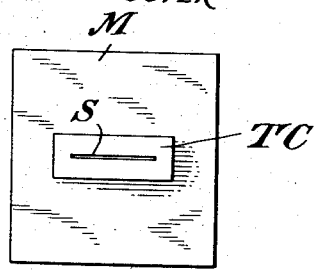
Fig. 11. Fuse Cover
Fig. 12. Cover United
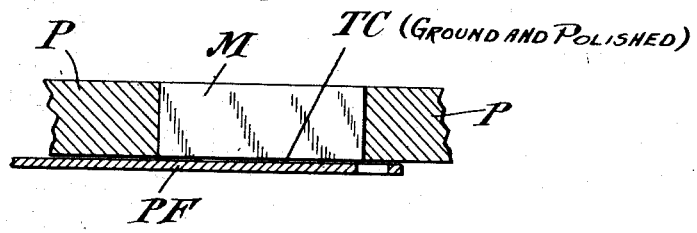
Fig. 13. Assembly
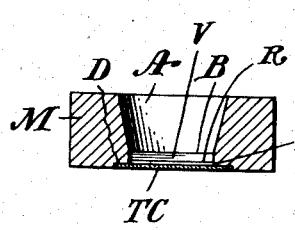
Fig. 14.
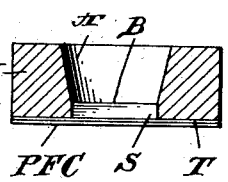
Fig. 15.
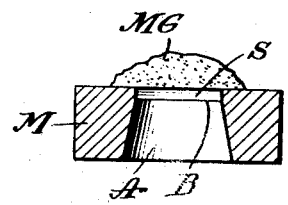
Fig. 16.
Inventor
JOHN KAUFMANN
By his Attorney Patented Sept. 11, 1928.

1,683,620

UNITED STATES PATENT OFFICE.

JOHN KAUFMANN, OF NEW YORK, N. Y., ASSIGNOR TO DE FOREST PHONOFILM CORPORATION, OF NEW YORK, N. Y., A CORPORATION OF NEW YORK.

SLOTTING AND SLITTED LIGHT TRANSMITTER.

Application filed September 8, 1925. Serial No. 55,067.

This invention relates to improvements in slotting, and in slitted light passages in light-transmitting members of sound-photograph apparatus, which apparatus may be either that for photographing (recording) the sounds or the apparatus used in reproducing the sounds from the photographic record. The sound-photograph apparatus to which the invention more particularly relates is that of prior inventions, wherein the operation is by light fluctuations, the light rays passing through a slit in the light-transmitting member of the apparatus above referred to. Usually the sound-photographing apparatus is employed in connection with motion-picture apparatus, i. e., camera and projecting-machine respectively; so that a single photographic film carries the records of both motion and sound, which are made simultaneously upon the film, and simultaneously reproduced. The photographic record is made on the usual portion of the film, which is intermediate the edges and the film-perforations by means of which the film is moved; and the sound record is made alongside the photographic record, but along a narrower space.

The object of the present invention is the production of a minutely-slotted passage through the light-transmitting member of the sound-photograph apparatus, such slit being protected from clogging or stoppage by dust, and thereby dispensing with a dust-removing air-blast. Another object is the production of a light-slit of extremely narrow width. Another object is the provision of a transparent dust-protecting cover over the light-slit, which cover shall lie substantially flush with the face of the light-transmitting member, along which face the photographic film travels. Other objects will appear hereinafter.

The invention consists of the improvements substantially as described hereinafter, specified in the claims and shown in the drawings, of which:

Figs. 1–10 are views of the light-transmitting member or "eye" of the sound-photograph apparatus, not accurately to scale but clearly illustrating the successive steps of the formation of the preferred extremely narrow light-slit itself;

Figs. 11–12 are similar views, illustrating the manufacture of the product which comprises the preferably integral combination of the slotted light-transmitting member and its transparent dust-protecting cover;

Fig. 13 is a view illustrating the assembly of the slotted and dust-protected light-transmitting member with the adjacent parts of the apparatus for recording or reproducing the sound;

Fig. 14 is a view illustrating a modification; and

Figs. 15 and 16 are views of other modifications.

The invention relates particularly to the art of talking-motion pictures or phonofilms. Heretofore in this art, the light for the sound-photography and sound-reproduction has been supplied to the photographic film near one edge thereof (Fig. 13) through a slotted member or eye across the front of which the film is moved intermittently. The slits in this eye have been oblong, short and narrow openings about 1/16 to 3/32 inch long by a mil and half wide. It is highly desirable, for optical reasons, that these narrow slits be made even narrower; but even the one-mil slits heretofore used have been liable to clogging by dust carried by the moving photograph film, which liability obviously would be further increased by reducing the width of the light-slit. An air-blast has been used, directed through the light passage, to keep it free of dust, but the photographic film for best results should travel through a fixed plane at constant distance from the front face of the light-transmitting member and in front of the light-slit, and such air-blast has blown the film so that, in addition to its desired movements across the face of the light-transmitter, its distance therefrom has been varied undesirably, causing more or less indistinctness of image of light on the film, resulting in faulty registration for recording and in unfaithful reproduction of sound. Furthermore, the film, for best results, should travel as close as possible to the face of the light film, this fact heretofore having militated against the provision of a dust-protecting cover for the light-slit, because the slit is so narrow as to make it impracticable to insert a dust-protector between the inside walls of the slit, and any dust-protector should not project substantially beyond the front face of the light-transmitting member so as to prevent the proper position of the film close to the light film.

In accordance with the present invention, the slit is made of the desired extremely minute width of half a mil, or even a smaller fraction of a mil; it is adequately protected against entrance of dust brought to its vicinity by the moving photographic film; and the construction is of such nature that the film can travel uniformly close to the front face of the light-transmitting member, the dust-protecting cover being substantially flush with such face although not located between the inside walls of the extremely narrow slit itself.

The slit is formed, by a series of manufacturing operations, in a metal block or plate M (Fig. 1), the front end of the resulting slit being shown at S in Fig. 8.

Thereupon a transparent cover TC (Fig. 12) is united with light-transmitting member M, the construction being such that the projecting thickness of cover TC is so slight that the front face of the cover is substantially flush with the face of member M itself in the sense that the film PF (Fig. 13) can travel close to the face of member M, although this cannot be indicated in the assembly of Fig. 13 on account of the slight thickness of cover TC. In fact, the dimensions of slit S, Fig. 10, and of cover TC, Fig. 13, and in the other drawings, are necessarily greatly enlarged for clearness.

The manufacture of the eye member which results in the formation of the specific slit S of Fig. 10 will be described in connection with Figs. 1–10.

The eye light-transmitting member M, Fig. 1, consists of a block or plate which of itself, initially, is comparatively thin, (exaggerated in Fig. 2), i. e. 1/64 inch or less or 1/16 inch or more. The member M is of any desirable superficial shape, such as square, Fig. 1, circular, or otherwise. It consists of material which preferably is tough (non-brittle) and ductile, in order to permit the successful execution of the manufacturing steps to be described. The material of member M may be, and preferably is, copper, but it may consist of other materials having said desired properties, such as other metals, or alloys of metals, or material which is non-metallic or comprises a non-metal element.

1st. (Figs. 1–2). A circular depression A, preferably tapered as shown, is bored or drilled in the back of member M (i. e., Fig. 13, its face remote from the traveling films). Fig. 1 shows the back of member M. Depression A may be about 5/32 inch in diameter at its entrance and preferably 3/32 inch at its bottom B, the taper extending from the entrance to said flat bottom. The diameter at the entrance of hole A is relatively immaterial, but the hole is preferably tapered in order to permit free access to the instruments employed in the further operations to be described. The diameter of flat bottom B corresponds with the length of slit S, Fig. 8, which is the final object of these operations. The dimension as long as 3/32 inch (for the diameter of flat bottom B and for the length of slit S) is preferred herein on account of the extreme desirable narrowness of the slit (half a mil, or even less) in order to provide for sufficient illumination.

Fig. 2 is a central section of Fig. 1, diametrically of depression A, showing flat bottom B, and the comparatively thin remaining undrilled portion or wall Z, the thickness Z of copper plate M being as thin as can be obtained conveniently by the drilling or boring tool, say, about 3 mils, more or less, but the thinner the better within the practical limits of the boring operation.

2nd. (Fig. 3, looking into depression A and upon flat bottom B). A second and smaller V-shaped depression or trough (V, Fig. 4), having a central bottom or ridge R (Fig. 3) is formed in flat bottom B across the diameter thereof. This is done by means of a small chisel or punching tool which has a very sharp edge having a length substantially equal to the diameter of bottom B and to the length of the slit S, Fig. 8. The chisel edge, preferably, at this stage, although sharp, is not permitted to perforate thin bottom B; but on account of the ductility or malleability of the material of plate M, a tap on the chisel causes a cold-flow of the copper downwardly, Fig. 4, forming a wale W on the front face of member M. The surface of flat bottom B is depressed at the trough V, as shown in Fig. 4, which is a section of Fig. 3, as indicated. The metal formerly occupying such space V is driven downwardly toward the front face of member M. The metal formerly occupying the space at the surface of member M is driven by the sharp punch or chisel downwardly beyond said surface so as to raise the wale W into more or less of a V-shape, Fig. 5, in conformity with inside V-shape of trough V, Fig. 4.

Up to this point, the thickness of this bottom wall Z, Fig. 4, has not been changed materially, the principal change being the change from the flat circular bottom wall B of Fig. 1 to the condition shown in Figs. 3 and 4, where the bottom B yet is flat save along the trough or indent V formed by the chisel. The object and the result of this operation is to form wale W, Figs. 4, 5, projecting slightly beyond the face of thin member M, from the much thinner wall Z and along the length of the desired slit S, Fig. 8; so that as a result of the formation of wale W, the wall Z may be reduced to a yet thinner wall or film of metal preparatory to the ultimate perforation of such film to form the slit S. While wale W, Fig. 5, of course is not much of an elevation above the face of member M, yet it is sufficient to be visible, at this stage, to the unaided eye of the artisan. While the edge of the chisel or other sharp punch is sufficiently sharp to produce trough V (inside) and wale W (outside), yet, since the function of this chisel-cut is not to form a slot through bottom B, the chisel is not so thin as the instrument later to be used to slot the thin bottom of depression A to form slit S of Fig. 8. It is to be understood that all the operations leading up to and including the slotting are very delicate and require the utmost of combined manipulatory and ocular artisanship, and even so the work is liable to be ruined in process. But the desirability of the object is so great, the improvement so valuable in respect of the sound photography and reproduction art, that temporary failures are discountable because quite satisfactory products have been made by the manufacture herein described.

3rd. The wale W of Fig. 5 then is ground or planed down until, as shown in Fig. 6, it has disappeared from the face of plate M, said face being entirely flat, and the only remaining portion of wall Z of Fig. 4 being, Fig. 6, a thin integral film F along the length of the ridge or bottom R of trough V, Fig. 3. Film F is thinnest along a line running with said ridge R, where it preferably is and can be made, by the process described, to be less than one mil thick, or even less. The section of Fig. 7 is taken 90 degrees to Fig. 6, as indicated, Fig. 7 being an attempt to indicate a section of the width of film F, which actually is little more than a line of metal film at its portion along the length of ultimate almost microscopic slot S of Fig. 8. Fig. 7, however, also indicates the fact that in the original region indicated at X, (on opposite sides of ultimate slit S), the metal wall at the bottom of depression A now is very thin although thicker than line-film F, being of gradually decreasing thickness from the tops of the sides A of trough V down toward ridge R of trough V. Hence, since the wall thickness Z of Fig. 4, including wale W, was only about 2 or 3 mils, and since wale W now has been eliminated, and since film F at ridge R of trough V has been formed with a thickness of about a mil or even half a mil, the wall thickness X, Fig. 7, will vary between half a mil up to 2 or 3 mils, and in the immediate vicinity of line-film F the wall thickness on both sides of said film will be very little more than a mil or half a mil, such thickness extending for distances on both sides of line-film F which distances are very substantial when compared with the width and thickness of film F itself. This thin wall is the portion of member M to which thin glass cover TC of Figs. 11-12 later (after formation of slit S) is united by fusion, and the thickness of this wall X may have something to do in facilitating such fusing operation.

4th. Thin, narrow, integral metal film F next is slotted (Fig. 8) to produce light-slit S of Figs. 8-10. This is done by a chisel or shim having a thinner or sharper edge than that of the chisel or punch employed in forming the trough V of Figs. 3-7, said first chisel or punch being relatively blunt. This slotting shim or chisel for the slotting operation of Fig. 8 is of hardened steel ground to a thin cutting edge of substantial depth and of a thickness which is exactly that of the desired width of the slit S, i. e. half a mil or even a smaller fraction of a mil. This slotting shim is inserted down through depression A and trough V, Fig. 8, the wall of trough V guiding the slotting instrument down toward line-film F (Fig. 7). Then the slotting tool is tapped lightly to cause its edge to perforate film F, producing slit S of the desired length (of the width of the cutting edge of the tool) and of a width corresponding with the length of the edge of the slotting tool; said slit S forming a light passage through an integral metal wall (F) which is only about half a mil or a mil thick, at the bottom of trough V. Through slit S light-rays pass via relatively large tapered circular bored depression A, and via trough V. The depth of the thin cutting edge of the slotting tool is relatively substantial and sufficient to prevent undesired enlargement of slit S after the front edge of the tool has perforated film F; but such depth of the cutting edge actually is not very great, preferably being less than the depth of the trough V in Fig. 7 after the elimination of wale W of Figs 4-5; so that the part of the slotting tool above its cutting edge may be shaped like that of the relatively blunt-edged punch or chisel used to form trough V, and so that the slotting tool may be guided to its slotting operation. Thus, the sharpened slotting tool or shim, before its cutting edge reaches film F, will be guided by the side walls of trough V so as to aline the cutting edge with narrow thin film F.

By this method it is practical to make slit S as narrow as half a mil or even less. Fig. 9 is a section like Figs 4 and 6 showing the length of trough V; but Fig. 9 also shows slit S in elevation as extending through the bottom of trough V. The ductility or lack of brittleness of material of member M prevents breakage along lines which would constitute substantial departures from the desired rectangular channel S through bottom B of plate M, although, of course, minute particles of metal may remain as lips around the edges of slit S.

5th. Next, by means of an oil-stone, the front face of plate M around slit S is polished smooth and planed, (Figs. 9-10) removing any slight lips of metal which may remain after the slotting operation of Fig. 8. Slit S as formed hereby is so narrow that after this operation it is almost invisible when the front face of member M is viewed in reflected light, and becomes clearly visible to the unaided normal eye of the observer only when member M is held so that slit S is in line between one's eye and a source of light.

6th. Plate M next is provided with a transparent cover TC over slit S (Figs. 11-12), applied on the portions of the front face of M which surround the slit; and this application is made so as to provide a cover which shall be substantially flush with the front face of member M, i. e., which shall not project sufficiently beyond said front face to prevent the photographic film (PF, Fig. 13) from traveling very close indeed to said front face, as is essential for best sound-photography. It would be desirable to mount a transparent "window pane" inside slit S between the walls thereof, but the extreme narrowness of the slit makes that impracticable. A very thin, flat, smooth sheet of clear glass or quartz TC of any desirable superficial configuration is laid (Fig. 11) on top of member M so as to cover slit S and also a substantial portion of wall X (Fig. 7) of member M around the slit; so that there will be substantial surface contact between cover TC and the thin integral wall X, Fig. 7, of member M.

While this transparent cover TC, at this stage, (Fig. 11) may be as thick as one mil, more or less (preferably in connection with the form of member M thus far disclosed), requiring later treatment to reduce its thickness so that it lies substantially flush with the front face of member M, and while at this stage (Fig. 11) the transparent cover TC may be too thick for the final product, yet the important object of the present operation of Fig. 11 is permanently and integrally to unite cover TC with member M; and this may be done with an initial thickness of TC as great as one mil. The cover TC, however, is, at this stage, as thin as is convenient to handle and a thickness of one mil is satisfactory, being thin enough to permit the fusing operation now to be described. The thickness of metal wall X, Fig. 7, with which cover TC makes contact, has been above described as being very slight, altho a little greater than the depths of slit S. Cover TC preferably extends only slightly beyond the edges of slit S, which, as described, is only a fraction of a mil wide and 1/16 to 3/32 of an inch long; so that the superficial dimensions of cover TC need not be very large, notwithstanding that it extends sufficiently beyond the edges of slit S as to be united with this wall X member M (Fig. 7). Under these conditions the parts M and TC are subjected to a high temperature of about that of the red heat of iron, which is the fusing point of the glass. (If quartz be used, it is cemented to member M.)

This fusing operation can be conducted with a gas flame, but preferably is effected in a suitable furnace, as one heated by a gas flame.

In order to avoid destruction of the cover TC by the fusing temperature, it is desirable to raise the temperature of member M gradually, so that the portion of its surface (wall X) adjacent glass TC will not delay the heating of the adjacent surface of the glass. It is probable that the thinness of wall X, Fig. 7, to the outer surface of which cover TC is fused, contributes to the sufficient fusing of the adjacent glass surface prior to injurious action of the high temperature on the glass cover TC as a whole.

Under the above conditions, the contacting glass surface of TC will be fused to the adjacent copper surface of wall X (Fig. 7), so that parts M and TC will be united by such fusion, the material of transparent cover TC being in absolutely close chemical cohesion with the copper of metal wall X, just as if both these parts were of Fig. 7, metal and welded together. Promptly upon this integral joining by fusion, the application of the high temperature is discontinued, so as to avoid injury to the thin cover TC; but thereafter the cooling should not be sudden but preferably should be as slow as possible. Whereupon the parts M and TC will be permanently united in a single integral structure (Fig. 12). In effect this product is a thin transparent film or coating adherent to thin wall X of member M over slit S.

7th. Small, thin, transparent cover TC now, by virtue of its incorporation in member M, is in condition which will permit convenient reduction of its thickness. As is sought to be indicated in Figs. 12 and 13, it is thicker in the former figure than in the latter. After the fusing operation, therefore, the surface of cover TC is ground down (as by a grindstone) from the thickness indicated in Fig. 12. Its outer surface then is polished (as by a whetstone) until the glass or quartz is perfectly clear and the thickness TC is reduced to a fraction, and preferably a small fraction, of a mil, as indicated but not practicable to be actually shown in Fig. 13.

8th. Member M, with its slit S, preferably of a small fraction of a mil, and protected by the integral transparent cover TC of a like order of thickness and located substantially flush with the front face of member M, now is assembled with plate P of Fig. 13 in the camera or projecting-machine, plate P being the part across which the photographic film PF travels (perpendicularly to the plane of the sheets of drawings). Fig. 13 shows member M and its united cover TC, in elevation and mounted in place in plate P, shown in section. As shown in Fig. 13, transparent cover TC, over light-slit S in member M, is located so as to be in light-communication with the righthand side of photographic film PF near one longitudinal edge thereof, on which the sound is to be or has been recorded, the photographs of motion being, as usual, on the central portion of film PF to the left of cover TC and the extreme sides of film PF next its longitudinal edges being perforated, as ordinarily, to permit the mechanism of the camera or projecting-machine to move the film transversely to the length of slit S. Although in Fig. 13 the transparent cover TC is shown as projecting substantially beyond the front face of member M, yet actually, in accordance with the above description, cover TC lies substantially flush with such face, it being impossible in the drawing to show this fact, on account of the extreme thinness of cover TC, particularly after the grinding and polishing operations subsequent to the uniting fusion. As the result of the actual substantial flushness of cover TC and front face of member M, the photographic film PF can travel with the desired closeness to said front face.

Although on account of the extremely narrow width of slit S it is impracticable to locate transparent cover TC inside the walls of the slit, yet in the modification of Fig. 14 the cover is prevented from projecting even a fraction of a mil beyond the front face of the member M by being inset in the flat-bottomed depression D bored in the front face of member M early in the operations, as about the time when depression A, Figs. 1, 2, is bored; the manufacture otherwise being permissibly the same as Figs. 1–12, if desired, or Figs. 1–10. The diameter of depression D of Fig. 14 is immaterial, save that it should be sufficient to permit convenience of conducting the operations of Figs. 2–10, in cases where those are executed on the modification of Fig. 14 as is preferred. In this modification, cover TC may be of any desired thickness up to the maximum permitting securing to member M by fusion; but the walls of depression D may serve as supports for the cover TC and the latter be secured thereto in proper position in depression D by any suitable means other than fusion, and including cement (as in the case of a TC of quartz); and in such case the cover TC may be of any desired dimension of thinness or thickness, unlimited by any requirement of fusion and permissible by optical conditions and by the material of which the cover TC itself may be composed.

The advantage of any modification including depression D of Fig. 14 in connection with the operations of Figs. 1–10, is that it obviates the reduction in thickness of cover TC by the grinding and polishing (Fig. 13) after fusing (Fig. 11). Whatever the thickness of cover TC may be, the depth of depression D is preferably substantially the same as that, so that the front face of the cover will lie absolutely flush with the front face of member M after the cover is suitably secured within the depression.

Fig. 15 illustrates another modification, wherein the desired substantially plane surface for presentation to photographic film PF, Fig. 13, is provided, (in lieu of the method of Figs. 11–12, and in lieu of depression D of Fig. 14), by a transparent covering PFC, which extends over all or as much of the plane front face of member M as is desirable, in order to present a plane surface to the photographic film (Fig. 13) and permit the latter to travel close to the former. Here (Fig. 13) the transparent covering PFC may consist of a sheet of the base material employed in photographic films and to which the sensitive chemical coating thereof is applied in producing photographic sensitivity; and such base film readily can be cemented at T to the face of member M. Other forms of transparent covering (notably of very thin mica) may be applied in this manner, i. e., by cementing them to a large extent of the face of member M, and in these cases slit S may be formed in any desired manner, although preferably as in Figs. 1–10.

Although, on account of the preferably minutely narrow width of slit S, it is impracticable to locate in dust-sealing relation in side the walls of the slit any previously-shaped transparent solid dust-protecting cover or shield, yet in Fig. 16 is illustrated a method by which a shield of glass or the like may be mounted inside the light channels which extends through the thin wall X, Fig. 7, of member M. In this case the metal member M itself, fabricated as in Figs. 1–10 but now not previously heated, has applied to it, over slit S, a minute molten mass MG of a material such as glass cement or glass (see below), which is solid at ordinary temperatures or upon drying; and thereupon the small soft fluid or molten mass is pressed toward member M, causing a very small portion indeed of mass MG to be forced into slit S between the walls thereof, or to extend across the end of the light channel so as to avoid formation of a prism which would absorb too much light or diffuse it too much. Thereupon the entire mass of fluid molten material MG is allowed to cool and solidify, and the excess beyond a slight thickness outside of slit S is ground completely off, leaving only a minute amount inside the slit or at its opening in dust-sealing relation to the walls thereof and flush with the surface of member M. The mass MG may consist of transparent liquid chemical combinations not requiring to be fused, such as pyroxylin, collodion and the like, including those having an alcohol constituent or solvent, so that the solvent will evaporate, leaving a transparent solid residue inside slit S and sealing it. In such cases, the liquid may be applied on top of member M over a large portion of the front face thereof and over slit S, and forced into or merely over the slit (or both) by means of application with a brush and then allowed to solidify by evaporation of the solvent. Slit S is so narrow that its surrounding metal wall will support various kinds of such coatings, including a transparent coating of shellac.

The advantages of the invention above specifically described are in general that it provides a desirably narrow light-slit, which is prevented from becoming clogged with dust by means of a transparent coating or cover, which makes unnecessary any air blast, but which will, by being substantially flush with the light-transmitting member, permit the front face thereof to be traversed by the photographic film in close relation thereto and always in the same plane.

In any case, the greater part of the mass of member M constitutes a support and protection for the integral film F (Figs. 6-7), part of which is perforated to form slit S; and such grosser mass serves to support said slotted film F in proper position in plate P of Fig. 13, relative to the operation of the photographic film PF on which the sound photographs have been or are to be made.

In the claims, the words "glass" and "metal" are used inclusively of equivalents; and the expression "sound photograph apparatus" is intended to include the sound reproducing apparatus, as well as the sound recording apparatus.

I particularly point out and distinctly claim the part, improvement or combination which I claim as my invention or discovery as follows:

1. A light-transmitting element for a light-fluctuating sound-photograph apparatus, comprising a copper member formed with a portion consisting of a thin self-supporting integral film substantially less than a mil in thickness, said film being perforated in the form of an oblong slit having a width of a fraction of a mil.

2. A light-transmitting element for a light-fluctuating sound-photograph apparatus, comprising a copper member formed with a portion consisting of a thin integral film, said film being perforated in the form of an oblong slit having a width of a fraction of a mil; and a thin transparent dust-excluding coating adherent to said copper member and extending over said slit as a dust protector.

3. A light-transmitting element for a light-fluctuating sound-photograph apparatus, which comprises a member formed with a depression of comparatively large diameter extending nearly through it, an integral film almost closing the opposite face of said member in line with said depression; said film being perforated to form a light-slit; and a film-like transparent dust-protecting cover extending over said slit and fused to the face of said member around the slit therein.

4. A light-transmitting element for a light-fluctuating sound-photograph apparatus, which comprises a copper member formed with a relatively long light-slit and a glass cover extending over said slit as a dust protector and fused to the surface of said copper member around said slit.

5. A light-transmitting element for a light-fluctuating sound-photograph apparatus, which comprises a member formed with a light-slit having a width of the order of a fraction of a mil and having fused to it a transparent cover extending over the slit; the outer face of said slit-cover being substantially flush with the face of the slotted member.

6. A light-transmitting element for a light-fluctuating sound-photograph apparatus, which comprises a metal member formed with a relatively long narrow slit; and a cover of transparent material extending over said slit, fused to the face of the metal member around the slit, and having a thickness of the order of a mil or less.

7. A light-transmitting element for a light-fluctuating sound-photograph apparatus, comprising a member formed with a depression having a flat bottom, and formed with a trough extending across the flat bottom, and formed also with a thin integral film on opposite sides of the ridge of said trough; said film being perforated along the ridge of the trough to constitute a constricted light-channel having a correspondingly narrow entrance slit.

8. A light-transmitting element for a light-fluctuating sound-photograph apparatus, comprising a member formed with an inwardly-tapered depression and an integral wall closing the bottom of the depression save for a perforaton of said wall in the form of an oblong narrow slot; and a transparent dust-excluding cover secured to said member and extending over said slot, the whole presenting a substantially plane surface to the photograph film.

9. A light-transmitting element for a light-fluctuating sound-photograph apparatus, which comprises a metal member formed with a depression of comparatively large diameter extending almost through it; and and integral film separating said depression from the opposite face of the metal member and closed to light transmission save for a perforation of the film in the form of an oblong narrow slit.

10. A blank for a light-transmitting element for a light-fluctuating sound-photograph apparatus, said blank comprising a member formed with a depression of comparatively large diameter extending almost through it, and an integral film having a portion less than a mil in thickness separating the bottom of said depression from the opposite face of said member.

11. The improvement in the manufacture of a light-transmitting element for a light-fluctuating sound-photograph apparatus, which consists in forming a portion of a tough ductile member into the form of an integral film having a portion less than a mil in thickness, and then perforating said film to form a minute light-passage in the form of an oblong narrow light-slit.

12. The improvement in the manufacture of a light-transmitting element for a light-fluctuating sound-photograph apparatus, which consists in forming a portion of a tough ductile member into a part having comparatively slight thickness; punching an oblong portion of said thin part slightly beyond the face of said ductile member; removing the projecting portion of the punched part to form an integral metal film; and forming a perforation of said film in the form of an oblong narrow light-slit.

13. A light-transmitting element for a light-fluctuating sound-photograph apparatus, which comprises a member of tough ductile metal having a portion formed as an integral film of metal less than a mil in thickness, said film being perforated to form an oblong narrow light-slit.

14. A light-transmitting element for a light-fluctuating sound-photograph apparatus, which comprises a metal light-transmitting member having a portion in the form of an integral film less than a mil in thickness, said film being perforated forming an oblong light-slit of extremely slight width.

15. A light-transmitting element for a light-fluctuating sound-photograph apparatus, which comprises a metal member formed with a portion of reduced thickness and with a light-channel extending through it and terminating at said thin portion of the metal member at a surface thereof, said thin portion being formed with a fine slit smaller than the rest of the light-channel and constituting a continuation and the termination of said light-channel; and a thin transparent member located substantially at said surface of said metal member and extending across said slit in the thin portion thereof.

JOHN KAUFMANN.